United States Patent
Sandusky et al.

(10) Patent No.: US 7,495,748 B1
(45) Date of Patent: Feb. 24, 2009

(54) SCANNERLESS LOSS MODULATED FLASH COLOR RANGE IMAGING

(75) Inventors: John V. Sandusky, Albuquerque, NM (US); Todd Alan Pitts, Rio Rancho, NM (US)

(73) Assignee: Sandia Corporation, Albuquerque, NM (US)

( * ) Notice: Subject to any disclaimer, the term of this patent is extended or adjusted under 35 U.S.C. 154(b) by 12 days.

(21) Appl. No.: 11/874,241

(22) Filed: Oct. 18, 2007

Related U.S. Application Data

(63) Continuation-in-part of application No. 11/841,050, filed on Aug. 20, 2007, now Pat. No. 7,420,656.

(51) Int. Cl.
*G01C 5/00* (2006.01)
(52) U.S. Cl. ....................................... 356/5.1
(58) Field of Classification Search ........ 356/3.01–28.5
See application file for complete search history.

(56) References Cited

U.S. PATENT DOCUMENTS

| | | | |
|---|---|---|---|
| 4,935,616 A | 6/1990 | Scott | |
| 6,088,086 A * | 7/2000 | Muguira et al. | 356/5.15 |
| 6,456,793 B1 | 9/2002 | Ray et al. | |
| 6,507,706 B1 | 1/2003 | Brazas et al. | |
| 6,584,283 B2 * | 6/2003 | Gabello et al. | 396/109 |
| 6,707,054 B2 | 3/2004 | Ray | |
| 6,856,355 B1 | 2/2005 | Ray et al. | |
| 7,135,672 B2 | 11/2006 | Land | |
| 7,206,062 B2 | 4/2007 | Asbrock et al. | |

OTHER PUBLICATIONS

Siepmann, J.P., "Fusion of current technologies with real-time 3D MEMS ladar for novel security & defense applications", Laser Radar Technology and Applications XI, Proc. of SPIE, vol. 6214, 621409, (2006), 8 pages.

Stettner, R., et al., "Eye-safe laser radar 3-D imaging", Laser Radar Technology and Applications IX, Proc. of SPIE, vol. 5412, (2004), pp. 111-116.

(Continued)

*Primary Examiner*—Thomas H Tarcza
*Assistant Examiner*—Luke D Ratcliffe
(74) *Attorney, Agent, or Firm*—William R. Conley

(57) ABSTRACT

Scannerless loss modulated flash color range imaging methods and apparatus are disclosed for producing three dimensional (3D) images of a target within a scene. Apparatus and methods according to the present invention comprise a light source providing at least three wavelengths (passbands) of illumination that are each loss modulated, phase delayed and simultaneously directed to illuminate the target. Phase delayed light backscattered from the target is spectrally filtered, demodulated and imaged by a planar detector array. Images of the intensity distributions for the selected wavelengths are obtained under modulated and unmodulated (dc) illumination of the target, and the information contained in the images combined to produce a 3D image of the target.

20 Claims, 4 Drawing Sheets

OTHER PUBLICATIONS

Anderson, D., et al., "Experimental characterization of Commercial Flash Ladar Devices", Proc. of the First International Conference on Sensing Technology, Nov. 21-23, 2005, Palmerston North, New Zealand, pp. 17-22.

Pack, R.T., et al., "A co-boresighted synchronized ladar/EO imager for creating 3D images of dynamic scenes", Laser Radar Technology and Applications X, Proc. of SPIE, vol. 5791, (2005), pp. 42-50.

Garcia, P. et al., "Nonscanned ladar imaging and applications", Proc. of SPIE, vol. 1936, pp. 11-22, Oct. 1993.

Johnson, K., et al., "Adaptive ladar receiver for multispectral imaging", Laser Radar Technology and Applications VI, Proc. of SPIE, vol. 4377, (2001), pp. 98-105.

Halmos, M.J., et al., "3-D flash ladar at Raytheon", Laser Radar Technology and Applications VI, Proc. of SPIE, vol. 4377, (2001), pp. 84-97.

Kodak KAI-0330S Image Sensor Performance Specification, Jun. 2, 2003, rev. 2.0, (Figure 14, p. 23), 33 pages, [online] [retrieved on Apr. 30, 2007] retrieved from the Internet: <URLhttp://www.kodak.com/ezpres/business/ccd/global/plugins/acrobat/en/datasheet/interline/KAI-0330LongSpec.pdf>.

* cited by examiner

SCANNERLESS LOSS MODULATED FLASH COLOR RANGE IMAGING

RELATED APPLICATIONS

This application is a continuation in part of U.S. application Ser. No. 11/841,050 filed on Aug. 20, 2007 now U.S. Pat. No. 7,420,656, Titled: "Scannerless Loss Modulated Flash Color Range Imaging", the entirety of which is herein incorporated by reference.

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to scannerless, loss modulated, flash color range imaging. The invention further relates to methods and apparatus for producing three-dimensional (3D) images of a target illuminated by at least three wavelengths of light, each wavelength being loss modulated and having an impressed phase delay, wherein backscattered light from the target is loss demodulated and received by an array detector and converted to an electrical signal, wherefrom information related to the demodulated intensity of each wavelength of phase delayed light is combined to determine the range to the target.

BACKGROUND OF THE INVENTION

Previous three-dimensional range imaging systems typically illuminate a target with a modulated monochromatic light source (e.g. a laser) and determine range to the target by a comparison of multiple images of the intensity distribution of modulated back scattered light received by an array detector, wherein each image corresponds to a unique phase delay being applied to the modulated monochromatic illumination. See for example, U.S. Pat. Nos. 4,935,616 and 6,088,086 and U.S. patent application Ser. No. 11/477,248 the entirety of each of which is hereby incorporated by reference. Other three-dimensional imaging systems may incorporate more than one monochromatic light source, but again range information is determined by separately (e.g. sequentially) illuminating the target with a given wavelength and determining range values based upon multiple images of received intensity distributions for that wavelength of the illumination source. These systems typically illuminate a scene serially with light sources of various wavelengths to "see through" clutter or ground cover. See for example, Johnson et al., "Adaptive LADAR Receiver for Multispectral Imaging", Proceedings of SPIE, Vol. 4377 (2001). These approaches are necessarily restricted to determining range information by processing multiple monochromatic images of a given wavelength of backscattered illumination of the target, and typically require obtaining a separate "color" image of the target for textural information.

The present invention overcomes these limitations by simultaneously illuminating a target with at least three wavelengths of light (i.e. not monochromatic illumination) and determining range information based upon the collective processing of the obtained "color" images. In embodiments of the present invention, a target is illuminated with at least three wavelengths of light, each wavelength being loss modulated and having an impressed phase delay, wherein backscattered light from the target is loss demodulated and received by an array detector and converted to an electrical signal for each wavelength of illumination, wherefrom information related to the demodulated intensity distributions of each of the separate wavelengths is combined to determine the range to the target, on a point by point (e.g. pixel by pixel) basis. For embodiments utilizing illumination wavelengths within the visible spectrum, a "true color" image of the target as well as range information can be obtained from two images of the target. A "3D" image of the target can comprise a color image of the target supplemented with topographical (i.e. range) information. The present invention additionally allows for using inexpensive, commercially available light sources and array detectors, such as a xenon flash lamps and color CCD (charge coupled device) imagers. The present invention is suitable to applications including facial recognition, industrial inspection and measurement, robotic vision, collision avoidance, automated rendezvous and docking and, high speed three dimensional (3D) target imaging.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

Figure 1:
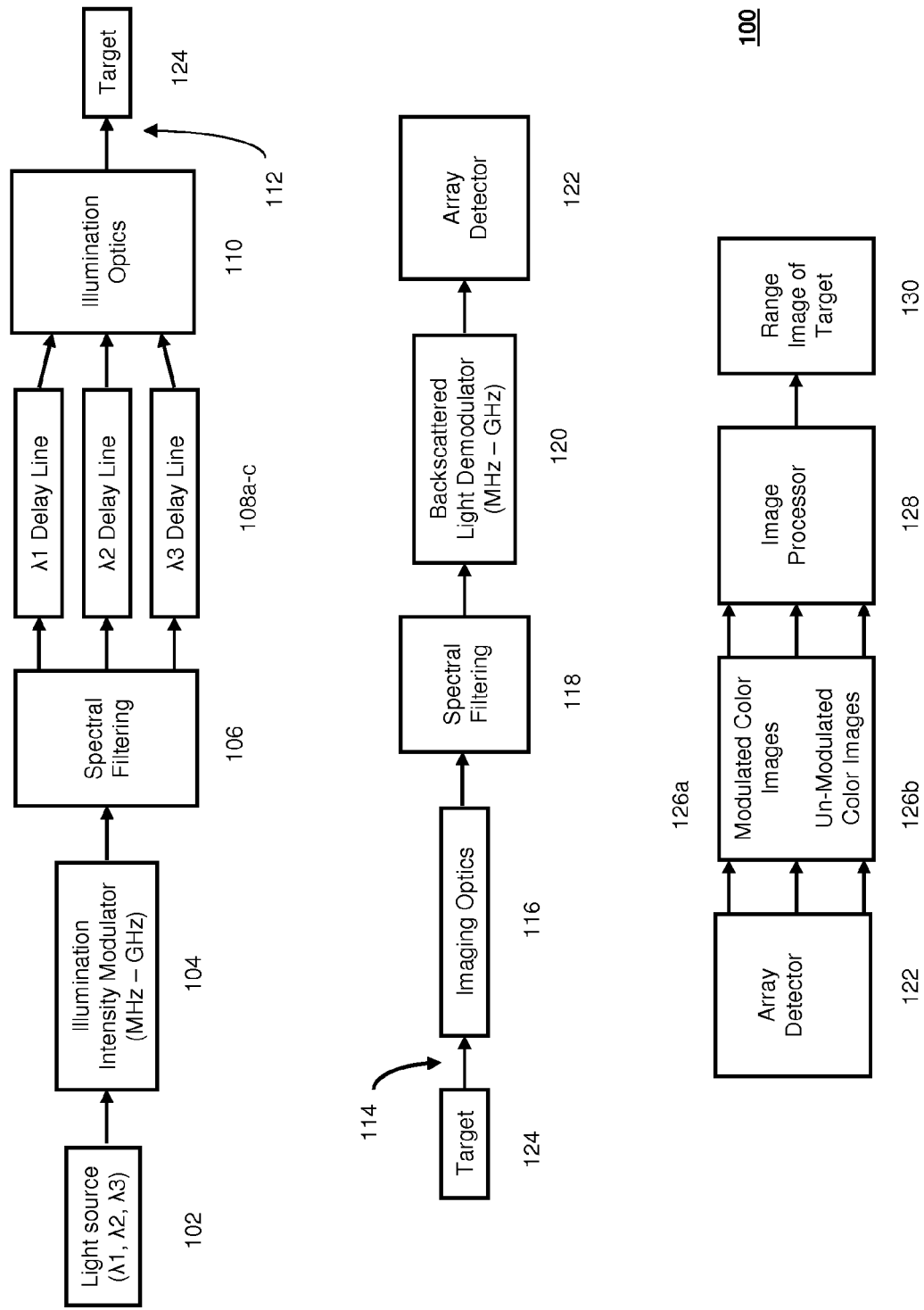
FIG. 1 is a schematic block diagram of an embodiment of a scannerless loss modulated flash color range imaging apparatus according to the present invention.

FIG. 1 is a schematic block diagram of an embodiment of a scannerless loss modulated flash color range imaging apparatus according to the present invention. Apparatus 100 comprises light source 102 adapted to simultaneously emit at least three wavelengths e.g. $\lambda_1$, $\lambda_2$, $\lambda_3$ of light for continuous or flash, non-scanned illumination of a target 124. Light source 102 can comprise a broadband light source, for example a xenon lamp, or can as well comprise an array of laser sources or light emitting diodes (LEDs), i.e. arrays of monochromatic sources of various desired wavelengths. Light source 102 can be operated in a continuously emitting mode to illuminate the target 124 or as well can be operated in a flash mode, whereby the target is illuminated by a flash of light lasting from on the order of a microsecond to on the order of 100's of microseconds. Flash illumination of the target 124 can be utilized in applications where it may be desired to maintain "eye-safe" levels of illumination on the target (e.g. as in facial recognition applications) by minimizing a subject's (i.e. target) exposure time to a bright illumination source and, to capture high speed moving targets.

The intensity of light from the light source 102 is amplitude modulated by loss modulator 104. Loss modulator 104 can comprise an electrooptic crystal disposed between a pair of crossed linear polarizers, wherein the electrooptic crystal is modulated at a sinusoidal frequency $f_o$. For the case where light source 102 comprises a broadband illumination source, amplitude modulated light exiting the loss modulator 104 can be passed through spectral filter(s) 106 to resolve desired wavelengths, e.g. $\lambda_1, \lambda_2, \lambda_3$. Each wavelength (i.e. a passband containing the wavelength of interest) can then be transmitted along a delay line comprising an optical path of known length, i.e. delay lines 108a-c to impart a unique phase delay $\phi_1, \phi_2, \phi_3$, to each of $\lambda_1, \lambda_2, \lambda_3$. Illumination optics 110 can be used to direct the illumination comprising $\lambda_1, \lambda_2, \lambda_3$, having impressed phase delays, to the target 124. The target 124 is said to be illuminated with "phase delayed" light 112 comprising the three selected wavelengths. As described below for the approach of the present invention, three or more wavelengths of light are employed to allow solving the mathematical relationships for determining the range to the target.

Backscattered phase delayed light 114 from the target 124 can be collected by imaging optics 116 and passed through spectral filter 118. Spectral filter 118 can allow for example, reducing the intensity of background illumination (e.g. sunlight) that may be backscattered from the target. Spectral filter 118 can be adapted to pass substantially equivalent wavelengths (e.g. passbands) as spectral filter 106. Light exiting spectral filter 118 is transmitted through backscattered light de-modulator 120 (i.e. loss modulator) which can be of similar construction to loss modulator 104 and operated at substantially the same frequency of amplitude modulation $f_o$. It is to be noted that in some embodiments of the invention, loss modulators 120 and 104 can be implemented in one device.

The intensity distribution of the demodulated light comprising $\lambda_1, \lambda_2, \lambda_3$ can be imaged by an array detector 122. Array detector 122 can for example comprise a commercially available color CCD (charge coupled device) imager (e.g. as found in a digital camera back) where $\lambda_1, \lambda_2, \lambda_3$, have been chosen to lie within the visible spectrum and within the "red", "green", and "blue" passbands of the color CCD array. For example, where the color CCD array comprises a Bayer filtering scheme, the passbands (i.e. wavelengths) of the spectral filters 118 and 106 can be chosen to substantially match that of the color imager. Typically, four active elements (i.e. array pixels) in a commercially available array detector comprise one image pixel, each element having a spectral filter in front of it; one element each is dedicated to the red and blue wavelengths and two elements to the green wavelength. In such applications, spectral filters 106 and 118 can be chosen to pass bands substantially similar to, or perhaps narrower than, the passbands of the spectral filters within the color CCD detector array.

The array detector 122 outputs an electrical signal containing information wherefrom the 3D image of the target can be constructed. To obtain a 3D image of a target within a scene, images 126a of the target are obtained, i.e. intensity distribution information over the array detector is collected for each of the three independent wavelengths wherein the illumination intensity modulator and the backscattered light demodulator are operated at some sinusoidal frequency $f_o$. Each of these images (126a) is referred to as a "modulated image". Images (126b) are additionally obtained of the target for each of the three independent wavelengths wherein the illumination intensity modulator and the backscattered light demodulator are not modulated, i.e. wherein the modulation frequency $f_o=0$. Each of these images is referred to as a "DC image". The intensity distribution information for the modulated and DC images for each wavelength, can then be combined and processed on a pixel by pixel basis, for example by utilizing an image processor 128 to yield a range image 130 of the target. The range image can for example, comprise a color image of the target with range information (e.g. topographic information) superimposed upon it. The processing of the modulated and DC images to obtain the desired range information is described in the following.

For each wavelength $\lambda_i$ (e.g. color channel or spectrally filtered passband including $\lambda_i$) exiting an aperture of the illumination optics the intensity as a function of time t at the exit aperture can be written as, $$I_{exit,i}(t)=(A_i+B_i\cos(\omega t+\phi_i)) \qquad \text{Eqn. 1}$$

where $\omega=2\pi f_o$ and $f_o$ is the frequency of modulation, $\phi_i$ is the imparted phase delay relative to time t=0, due to a delay line, the constant $A_i$ is the time-averaged photon flux rate (i.e. photons/sec) spatially integrated over the illumination exit aperture for each of the wavelengths (i.e. color channels) and the constant $B_i$ is the amplitude of modulation, constrained by $B_i < A_i$. Where three wavelengths of illumination are utilized, there would be three values of i (i.e. i=1, 2 and 3). The intensity of each of the color channels, for example, red, green and blue, is its sum of the phase acquired by that channel on modulation by the illumination modulator and its phase corresponding to its path length from the modulator through its delay line to the illumination exit aperture. Since the delay line for each color channel can be set by design and calibrated, the phase differences $\phi_1-\phi_2, \phi_2-\phi_3, \phi_3-\phi_1$, are precisely known for a given system.

The intensity of the modulated illumination is projected from an illumination exit aperture into a solid angle $\Omega$ (steradians) toward the target which scatters some of the illumination back toward the imaging optics. As the system images the scene onto a pixilated array detector, the following analysis considers a small surface area Q (square meters) of the target subtending the solid angular field-of-view (steradians) of an individual pixel within the array detector a distance R (i.e. the range) relative to the illumination exit aperture. Other parts of the target will generally be at different distances and within the field-of-view of other pixels.

For simplicity, the illumination exit aperture and the entrance pupil of the imaging optics are considered to be proximate relative to the distance R, so that the round-trip distance from the illumination exit aperture to the part of the target within the pixel's field-of-view to the imaging entrance pupil is approximately 2 R. As a practical matter, the range R is assumed to not depend strongly on the color channel; the target will generally scatter the color channels with varying effectiveness, but the penetration depth of illumination into that part of the target will not vary strongly with color (i.e. wavelength). The phase delay $\psi_{2R}$ corresponding to the distance 2 R is known from prior work to be given by, $$\psi_{2R}=2R\omega/c \qquad \text{Eqn. 2}$$

where c is the speed of light in the medium in which the target is immersed, generally assumed to be air or vacuum but which could be water or another medium as well.

The target can be imaged onto a field stop within the imaging optics of the system. The irradiance for each $\lambda_i$, $I_{FS,i}(t)$ (photons per second per square meter) at the field stop is proportional to the product $\rho_i(t)$ of the target reflectances and system objective lens efficiencies, which will generally be different for each color channel and for each pixel's field-of-view, and inversely proportional to the F-number, F, of the system objective lens. Equations 1 and 2 then yield the intensity in photons per second per square meter at the field stop, for each color channel, $$I_{FS,i}(t) = \frac{1}{F^2} \cdot \frac{1}{R^2\Omega} \cdot \rho_i(t) \cdot \left\{A_i + B_i\cos\left(\omega t + \phi_i + \frac{\omega 2R}{c}\right)\right\}. \quad \text{Eqn. 3}$$

The image of the target within the scene is demodulated by imaging the field stop through the electrooptic crystal demodulating assembly, which can linearly polarize the input to the crystal, and widen the crystal's demodulation field-of-view by using a combination of waveplates, and linearly polarize the output from the crystal and onto the focal plane array at a lateral magnification of M. The demodulation occurs as the crystal is driven with voltage in a fashion generally known as amplitude modulation and substantially the same frequency $f_o$ as the illumination modulation. The mathematical relations describing amplitude modulation have generally been published elsewhere in the literature, see for example; Sutherland, R. L. et al., "Handbook of Nonlinear Optics", 2$^{nd}$ edition, 2003, published by Marcel Dekker Inc., NY, N.Y., USA.

Though the transmission T of the electrooptic crystal for an individual pixel is in general expressible as a superposition of Bessel functions, for simplicity the case is assumed of small amplitude demodulation (e.g. on the order of 30% to 50%) where the transmission $T_i(t)$ of $\lambda_i$ through the electrooptic assembly can be approximated by, $$T_i(t) = \{D_i + E_i\cos(\omega t + \Theta_i)\} \quad \text{Eqn. 4}$$

where the constants $D_i$ is the time average transmission and $E_i$ is the amplitude of the time average transmission modulation. The two constants satisfy the constraint $D_i + E_i < 1$ and, $D_i - E_i > 0$. The relative phases $\Theta_1 - \Theta_2$, $\Theta_2 - \Theta_3$, $\Theta_3 - \Theta_1$ due to a phase shift versus wavelength dependency within the electrooptic crystal are determined by known methods of calibration.

The instantaneous photon flux density $S_i(t)$ (photons per second per square meter) at a pixel in the focal plane array, and incorporating relay optics efficiency in the definitions of $D_i$ and $E_i$ above, given by the relation, $$S_i(t) = \frac{1}{M^2}\{D_i + E_i\cos(\omega t + \Theta_i)\} \cdot \quad \text{Eqn. 5}$$
$$\frac{1}{F^2R^2\Omega} \cdot \rho_i(t) \cdot \left\{A_i + B_i\cos\left(\omega t + \phi_i + \frac{\omega 2R}{c}\right)\right\}.$$

For the example where the focal plane array comprises a color CCD array employing a Bayer color scheme, an individual pixel typically comprises four pixel elements two of which respond ideally to solely one color channel and the other two pixel elements independently respond solely to the other two color channels. Each pixel element is taken to have a height h and a width w and quantum efficiency $\eta$ (for a given wavelength) where the pixel elements are simultaneously exposed for a period of time T which is large compared to the modulation period $$\frac{2\pi}{\omega}.$$

The detector array response for the J$^{th}$ pixel element in counts C can be written as, $$C_{i,j(mod)} = \eta hw \cdot \frac{\rho}{M^2F^2R^2\Omega} \cdot \quad \text{Eqn. 6}$$
$$\int_0^T (D_i + E_i\cos(\omega t + \Theta_i))\left(A_i + B_i\cos\left(\omega t + \phi_i + \frac{\omega 2R}{c}\right)\right)dt$$

rearranging terms yields, $$C_{i,j(mod)} = \frac{\eta hw\rho}{M^2F^2R^2\Omega}D_iA_iT + \quad \text{Eqn. 7}$$
$$D_iB_i\int_0^T \cos\left(\omega t + \phi_i + \frac{\omega 2R}{c}\right)dt + E_iA_i\int_0^T \cos(\omega t + \Theta_i)dt +$$
$$E_iB_i\int_0^T \cos(\omega t + \Theta_i) \cdot \cos\left(\omega t + \phi_i + \frac{\omega 2R}{c}\right)dt$$

The second and third terms are negligible compared to the first and fourth terms when $$T \gg \frac{2\pi}{\omega},$$

allowing the integration to be approximated by, $$C_{i,j(mod)} = \frac{\eta hw\rho}{M^2F^2R^2\Omega}\left(D_iA_iT + \quad \text{Eqn. 8}\right.$$
$$\left.E_iB_i\int_0^T \cos(\omega t + \Theta_i) \cdot \cos\left(\omega t + \phi_i + \frac{\omega 2R}{c}\right)dt\right).$$

Solving the integral on the right hand side of the equation, $$\int_0^T \cos(\omega t + \Theta_i) \cdot \cos\left(\omega t + \phi_i + \frac{\omega 2R}{c}\right)dt = \quad \text{Eqn. 9}$$
$$\int_0^T (\cos(\omega t) \cdot \cos(\Theta_i) - \sin(\omega t) \cdot \sin(\Theta_i)) \cdot$$
$$\left(\cos(\omega t) \cdot \cos\left(\phi_i + \frac{\omega 2R}{c}\right) - \sin(\omega t) \cdot \sin\left(\phi_i + \frac{\omega 2R}{c}\right)\right)dt$$

and again neglecting cross terms, $$= \cos(\Theta_i)\cos\left(\phi_i + \frac{\omega 2R}{c}\right)\int_0^T \cos(\omega t)^2 dt + \quad \text{Eqn. 10}$$
$$\sin(\Theta_i) \cdot \sin\left(\phi_i + \frac{\omega 2R}{c}\right) \cdot \int_0^T \sin(\omega t)^2 dt$$

and, $$= \cos(\Theta_i) \cdot \cos\left(\phi_i + \frac{\omega 2R}{c}\right) \int_0^T \cos(\omega t)^2 dt +$$

$$\sin(\Theta_i) \cdot \sin\left(\phi_i + \frac{\omega 2R}{c}\right) \cdot \int_0^T \sin(\omega t)^2 dt$$

Eqn. 11

$$= \frac{T}{2}\left(\cos(\Theta_i) \cdot \cos\left(\phi_i + \frac{\omega 2R}{c}\right) + \sin(\Theta_i) \cdot \sin\left(\phi_i + \frac{\omega 2R}{c}\right)\right)$$

Eqn. 12

$$= \frac{T}{2}\cos\left(\phi_i + \frac{\omega 2R}{c} - \Theta_i\right).$$

Eqn. 13

Substituting the result (Eqn. 13) into Eqn. 8 then yields an approximation for the number of counts received in time T by the $j^{th}$ element receiving $\lambda_i$ for a modulated image, $$C_{i,j(mod)} = \frac{\eta h w \rho}{M^2 F^2 R^2 \Omega}\left(D_i A_i T + E_i B_i \frac{T}{2}\cos\left(\phi_i + \frac{\omega 2R}{c} - \Theta_i\right)\right).$$

Eqn. 14

An unmodulated (DC) image can be obtained by turning the intensity modulation off ($B_i = 0$) in the above equations. Which yields a measure of the unmodulated (DC) counts received in time T by the $j^{th}$ element receiving $\lambda_i$, $$C_{i,j(dc)} = \frac{\eta h w \rho}{M^2 F^2 R^2 \Omega}(D_i A_i T).$$

Eqn. 14

From Eqn. 14 one can obtain the reflectance $\rho$ and write, $$C_{i,j(mod)} = \frac{C_{j(dc)}}{D_i A_i T}\left(D_i A_i T + E_i B_i \frac{T}{2}\cos\left(\phi_i + \frac{\omega 2R}{c} - \Theta_i\right)\right).$$

Eqn. 15

Rearranging terms yields, $$C_{i,j(mod)} = C_{j(dc)}\left(1 + \frac{E_i B_i}{2 D_i A_i}\cos\left(\phi_i + \frac{\omega 2R}{c} - \Theta_i\right)\right).$$

Eqn. 16

Dividing the number of counts $C_{i,j(mod)}$ with modulation on by the number of counts $C_{j(dc)}$ with modulation off yields the ratio, $$\frac{C_{i,j(mod)}}{C_{i,j(dc)}} = 1 + \frac{E_i B_i}{2 D_i A_i}\cos\left(\phi_i + \frac{\omega 2R}{c} - \Theta_i\right).$$

Eqn. 17

Re-writing the ratio to group the constants $E_i$, $B_i$, $D_i$, $A_i$ into a single parameter $Q_i$ which in general can be known precisely but in practice is easier to treat as an unknown, and to emphasize the range R which is desired to be known, the following relationship can be developed, $$\frac{C_{i,j(mod)}}{C_{i,j(dc)}} = 1 + Q_i \cos\left(\phi_i - \Theta_i + \frac{\omega 2R}{c}\right).$$

Eqn. 18

A version of Eqn. 18 can be written for each wavelength of illumination, for example in the case where there are three color channels (i=1, 2, 3), $$\frac{C_{1,j(mod)}}{C_{1,j(dc)}} = 1 + Q_1 \cos\left(\phi_1 - \Theta_1 + \frac{\omega 2R}{c}\right)$$

Eqn. 19a $$\frac{C_{2,j(mod)}}{C_{2,j(dc)}} = 1 + Q_2 \cos\left(\phi_2 - \Theta_2 + \frac{\omega 2R}{c}\right)$$

Eqn. 19b and, $$\frac{C_{3,j(mod)}}{C_{3,j(dc)}} = 1 + Q_3 \cos\left(\phi_3 - \Theta_3 + \frac{\omega 2R}{c}\right).$$

Eqn. 19c

In the calibration of a system and in setting the length of the delay lines one can arrange for, $$\phi_2 - \Theta_2 = \phi_1 - \Theta_1 + \frac{\pi}{2}, \quad \text{and}$$

and $$\phi_3 - \Theta_3 = \phi_1 - \Theta_1 + \pi$$

which allows equations 19a-c to be re-written as, $$\frac{C_{1,(mod)}}{C_{1,(dc)}} = 1 + Q_1 \cos\left(\phi_1 - \Theta_1 + \frac{\omega 2R}{c}\right)$$

Eqn. 20A $$\frac{C_{2,(mod)}}{C_{2,(dc)}} =$$

$$1 + Q_2 \cos\left(\phi_1 - \Theta_1 + \frac{\pi}{2} + \frac{\omega 2R}{c}\right) = 1 - Q_2 \sin\left(\phi_1 - \Theta_1 + \frac{\omega 2R}{c}\right)$$

Eqn. 20 and, $$\frac{C_{3,(mod)}}{C_{2,(dc)}} =$$

$$1 + Q_3 \cos\left(\phi_1 - \Theta_1 + \pi + \frac{\omega 2R}{c}\right) = 1 - Q_3 \cos\left(\phi_1 - \Theta_1 + \frac{\omega 2R}{c}\right).$$

Eqn. 20

Rearranging terms yields, $$Q_1 \cos\left(\phi_1 - \Theta_1 + \frac{\omega 2R}{c}\right) = \frac{C_{1,(mod)}}{C_{1,(dc)}} - 1$$

Eqn. 21A $$Q_2 \sin\left(\phi_1 - \Theta_1 + \frac{\omega 2R}{c}\right) = 1 - \frac{C_{2,(mod)}}{C_{2,(dc)}}$$

Eqn. 21B and, $$Q_3 \cos\left(\phi_1 - \Theta_1 + \frac{\omega 2R}{c}\right) = 1 - \frac{C_{3,(mod)}}{C_{3,(dc)}} \qquad \text{Eqn. 21C}$$

Combining terms to emphasize solving for the range R, one can write, $$\tan\left(\phi_1 - \Theta_1 + \frac{\omega 2R}{c}\right) = \frac{Q_1}{Q_2} \cdot \frac{1 - \frac{C_{2,(mod)}}{C_{2,(dc)}}}{\frac{C_{1,(mod)}}{C_{1,(dc)}} - 1} \qquad \text{Eqn. 22A}$$

$$\tan\left(\phi_1 - \Theta_1 + \frac{\omega 2R}{c}\right) = \frac{Q_2}{Q_3} \cdot \frac{1 - \frac{C_{2,(mod)}}{C_{2,(dc)}}}{\frac{C_{1,(mod)}}{C_{1,(dc)}} - 1} \qquad \text{Eqn. 22B}$$

Equations 22A and 22B provide two estimates of the range to the target in terms of the measured modulated image counts $C_{i,(mod)}$ and unmodulated image counts $C_{i,(dc)}$, and parameters determined by system calibration including the ratios $$\frac{Q_1}{Q_2},$$

$$\frac{Q_2}{Q_3}$$

and phase shift ($\phi_1$-$\Theta_1$) between the illumination modulation and the backscattered light demodulation. The two estimates provided by equations 22A-B can be used together to reduce the effect of random system noise, producing a single estimate of the range R. It should be noted that only the relative values of the terms $$\frac{Q_1}{Q_2}$$

and $$\frac{Q_2}{Q_3}$$

are necessary to determine the range, as the relative values are easier to precisely measure than their individual values.

While the description that follows exemplifies embodiments wherein visible wavelengths of light are utilized, the invention anticipates the use of wavelengths outside the visible range, i.e. ultra-violet and infra-red illumination as well.

Figure 2:
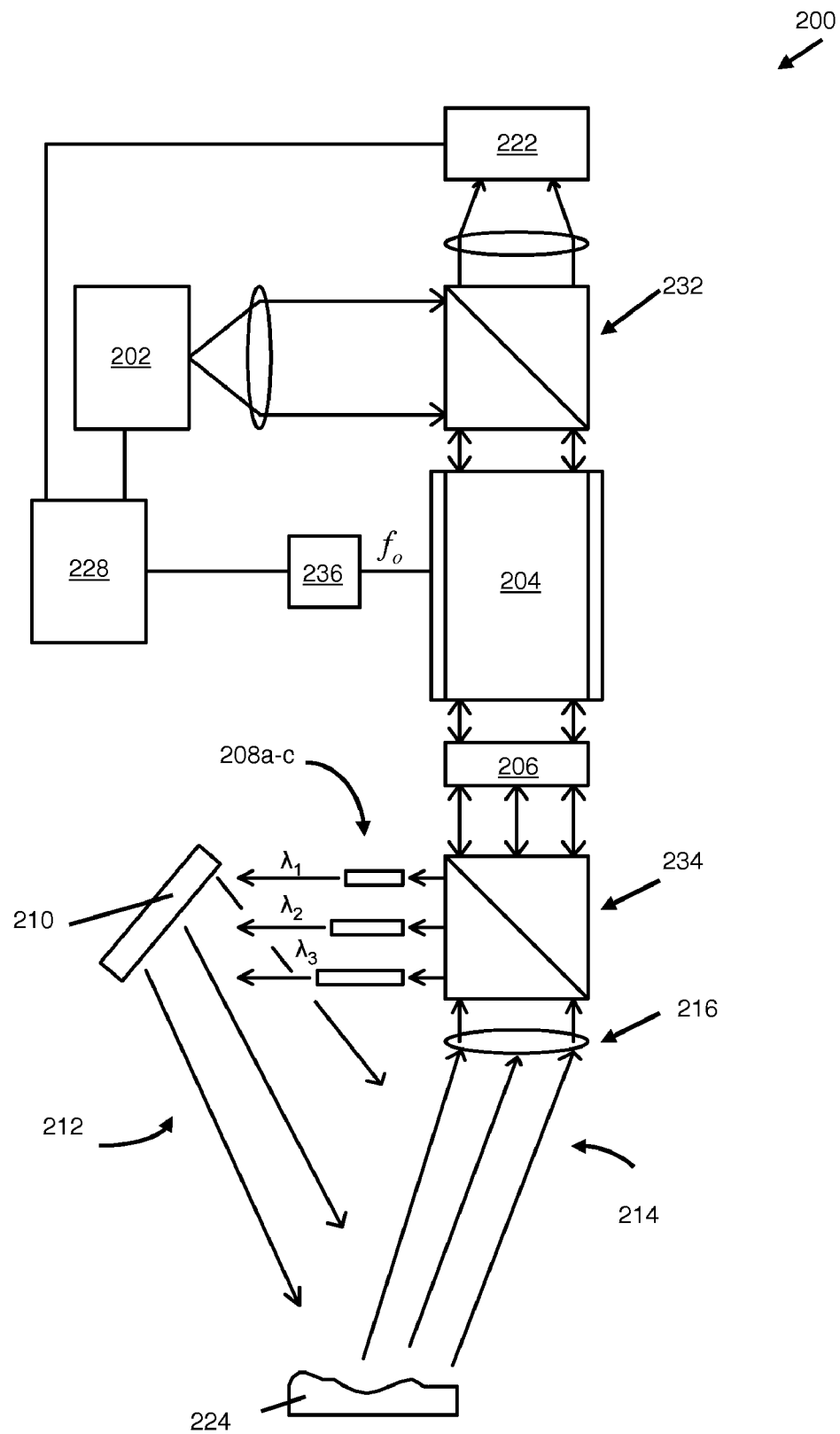
FIG. 2 is a schematic block diagram of a second embodiment of a scannerless loss modulated flash color range imaging apparatus according to the present invention.

FIG. 2 is a schematic block diagram of a second embodiment of a scannerless loss modulated flash color range imaging apparatus according to the present invention. In this exemplary embodiment, a single electrooptic crystal assembly is used to modulate light illuminating a target, and to demodulate light backscattered from the target.

Apparatus 200 comprises light source 202 providing at least three wavelengths ($\lambda_1$, $\lambda_2$, $\lambda_3$) of light for continuous or flash, non-scanned illumination of a target 224. Light source 202 can comprise a xenon flash lamp or could as well comprise an array of laser sources or light emitting diodes (LEDs), i.e. an array of monochromatic sources each having a desired wavelength. Light source 202 can be operated in a continuously emitting mode to illuminate the target 224 or can as well be operated in a flash mode whereby the target 224 is illuminated by a flash of light lasting from on the order of a microsecond to on the order of 100's of microseconds. Flash illumination of the target 224 can be utilized in applications where it may be desired to maintain "eye-safe" levels of illuminations (e.g. in facial recognition applications).

Light from the light source 202 can enter polarizing beam splitter 232, wherein a portion of the light is passed to loss modulator 204. Loss modulator 204 can comprise an electrooptic crystal, modulated at a sinusoidal frequency $f_o$ in response to a signal produced by modulation source 236. Loss modulator 204 is disposed between crossed polarizing elements, for example polarizing beam splitters 232 and 234, and acts to rotate the polarization of light transmitted through the loss modulator 204 by an amount depending on the magnitude of the voltage of the modulating signal (comprising $f_o$). The intensity of light transmitted through loss modulator 204 and polarizing beam splitters 232 and 234, is amplitude modulated in response to the modulating signal $f_o$. The electrooptic crystal can comprise for example, lithium niobate ($LiNbO_3$) or lithium tantalate ($LiTaO_3$) crystals for use with wavelengths within the visible spectrum. In other embodiments of the invention depending on the wavelengths of light to be used, other types of electrooptic crystals can be used including barium titanate ($BaTiO_3$), beta barium borate ($\beta$-$BaB_2O_4$), potassium dihydrogen phosphate (KDP), potassium titanyl phosphate (KTP), potassium niobate ($KNbO_3$), zinc selenide (ZnSe), gallium arsenide (GaAs), bismuth germanium oxide ($Bi_{12}GeO_{20}$) and bismuth silicon oxide ($Bi_{12}SiO_{20}$).

Light exiting loss modulator 204 can be passed through spectral filter 206 to separate out the desired wavelengths ($\lambda_1$, $\lambda_2$, and $\lambda_3$) (i.e. passbands or color channels containing the wavelength of interest) of illumination. For example, in some embodiments of the invention a xenon flash lamp can be used in conjunction with a commercially available red-green-blue (RGB) color filter (e.g. color filter model KAI-0330SCM, available from the Eastman Kodak Company, Rochester, N.Y., USA) to select wavelengths, i.e. passbands, centered on approximately 450 nm, 560 nm and 675 nm.

The separated spectral bands can then be transmitted through a polarizing beam splitter 234 and delay lines 208a-c (e.g. each comprising a unique optical path length) wherein a phase delay, $\delta_1$, $\delta_2$, and $\delta_3$, (for example, 0, 120 or 240 degrees) is imparted to each wavelength of the source illumination, $\lambda_1$, $\lambda_2$, and $\lambda_3$. Delay lines 208a-c can comprise a separate optical path for each wavelength, each having a unique path length, thereby impressing a unique phase delay on each wavelength. Delay lines 208a-c can comprise for example, three separate lengths of optical fibers. Illumination exiting the delay lines 208a-c can be directed to the target 224 by suitable illumination optics 210.

Light 214 backscattered from the target 224 is collected through imaging optics 216 and directed back through polarizing beam splitter 234, spectral filter 206, loss modulator 204 (i.e. where it is again loss modulated), polarizing beam splitter 232 and into an array detector 222. Array detector 222 can comprise a charge coupled device (CCD), a complementary metal-oxide semiconductor (CMOS) device and a focal plane array (FPA) device. In embodiments of the invention utilizing visible light, e.g. passbands centered on approximately 450 nm, 560 nm and 675 nm wavelengths, the array detector 222 can comprise a commercial color CCD camera with a Bayer color filtering scheme. The array detector 222 can as well comprise a plurality of "monochromatic" detectors, each having a spectral filter in front of it, tuned to one of the passbands selected from the light source 202.

Control of the scannerless loss modulated flash color range imaging apparatus 200 can be implemented by a control unit 228 interconnected to the light source 202, array detector 222 and loss modulator 204 via the modulation source 236. Controller 228 can comprise for example, a computer or personal computer, which can also embody image processing and display means. Processing of images acquired by apparatus 200 to produce 3D images of the target 224 can be accomplished as described above.

Figure 3:
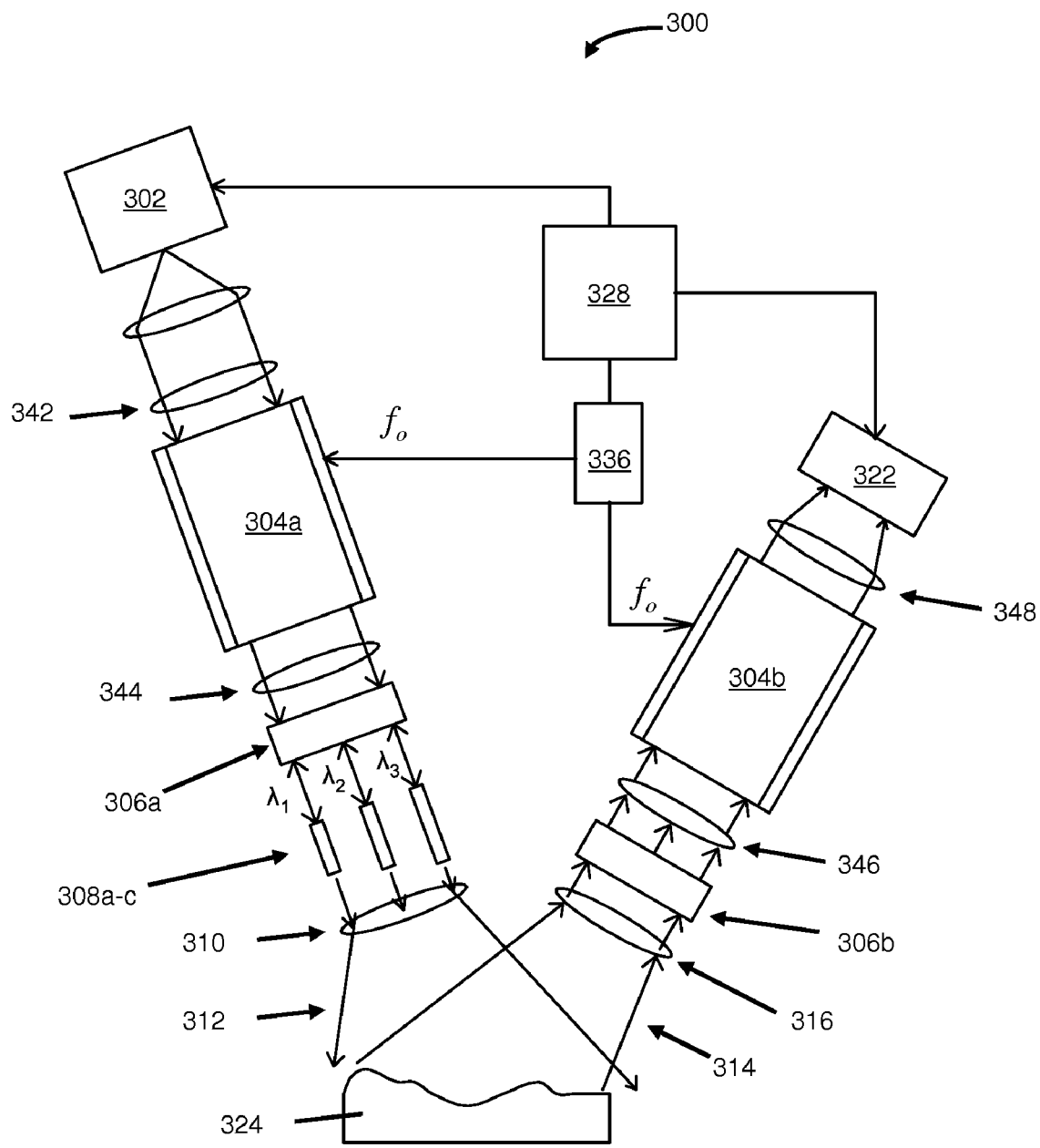
FIG. 3 is a schematic block diagram of another embodiment of a scannerless loss modulated flash color range imaging apparatus according to the present invention.

FIG. 3 is a schematic block diagram of another embodiment of a scannerless loss modulated flash color range imaging apparatus according to the present invention.

In this exemplary embodiment, two separate electrooptic crystal assemblies are used, one to modulate light illuminating a target, and a second to demodulate light backscattered from the target.

Apparatus 300 comprises light source 302 providing at least three wavelengths ($\lambda_1, \lambda_2, \lambda_3$) of light for continuous or flash, non-scanned illumination of a target 324. Light source 302 can comprise a xenon flash lamp or could as well comprise an array of laser sources or light emitting diodes (LEDs), i.e. an array of monochromatic sources each having a desired wavelength. Light source 302 can be operated in a continuously emitting mode to illuminate the target 324 or can as well be operated in a flash mode whereby the target 324 is illuminated by a flash of light lasting from on the order of a microsecond to on the order of 100's of microseconds. Flash illumination of the target 324 can be utilized in applications where it may be desired to maintain "eye-safe" levels of illuminations (e.g. in facial recognition applications) and, to capture high speed moving targets.

Light from the light source 302 is transmitted to loss modulator 304a. Loss modulator 304a can comprise an electrooptic crystal, modulated at a sinusoidal frequency $f_o$ in response to a signal produced by modulation source 336, disposed between a pair of crossed linear polarizers 342 and 344.

Light exiting loss modulator 304a can be passed through spectral filter 306a to separate out the desired wavelengths ($\lambda_1, \lambda_2,$ and $\lambda_3$) (i.e. passbands or color channels containing a wavelength of interest) of illumination. For example, in some embodiments of the invention a xenon flash lamp can be used in conjunction with a commercially available red-green-blue (RGB) color filter (e.g. color filter model KAI-0330SCM, available from the Eastman Kodak Company, Rochester, N.Y., USA) to select wavelengths, i.e. passbands, centered on approximately 450 nm, 560 nm and 675 nm.

The separated spectral bands can then be transmitted through delay lines 308a-c (e.g. each comprising a unique optical path length) wherein a phase delay, $\delta_1, \delta_2,$ and $\delta_3$, (for example, 0, 120 or 240 degrees) is imparted to each wavelength of the source illumination, $\lambda_1, \lambda_2,$ and $\lambda_3$. Delay lines 308a-c can comprise a separate optical path for each wavelength, each having a unique path length, thereby impressing a unique phase delay on each wavelength. Delay lines 308a-c can comprise for example, three separate lengths of optical fibers. Illumination exiting the delay lines 308a-c can be directed to the target 324 by suitable illumination optics 310.

Light 314 backscattered from the target 324 is collected through imaging optics 316 and directed through, spectral filter 306b, loss modulator 304b, and into an array detector 322. Loss modulator 304b can comprise an electrooptic crystal disposed between a pair of crossed linear polarizers 346 and 348, and be modulated at the sinusoidal frequency $f_o$ in response to a signal produced by modulation source 336. Array detector 322 can comprise a charge coupled device (CCD), a complementary metal-oxide semiconductor (CMOS) device and a focal plane array (FPA) device. In embodiments of the invention utilizing visible light, e.g. passbands centered on approximately 450 nm, 560 nm and 675 nm wavelengths, the array detector 322 can comprise a commercial color CCD camera with a Bayer color filtering scheme. The array detector 322 can as well comprise a plurality of "monochromatic" detectors, each having a spectral filter in front of it, tuned to one of the passbands selected from the light source 302.

Control of the scannerless loss modulated flash color range imaging apparatus 300 can be implemented by a control unit 328 interconnected to the light source 302, array detector 322 and loss modulators 304a-b via the modulation source 336. Controller 328 can comprise for example, a computer or personal computer, which can also embody image processing and display means. Processing of images acquired by apparatus 300 to produce 3D images of the target 324 can be accomplished as described above.

Figure 4:
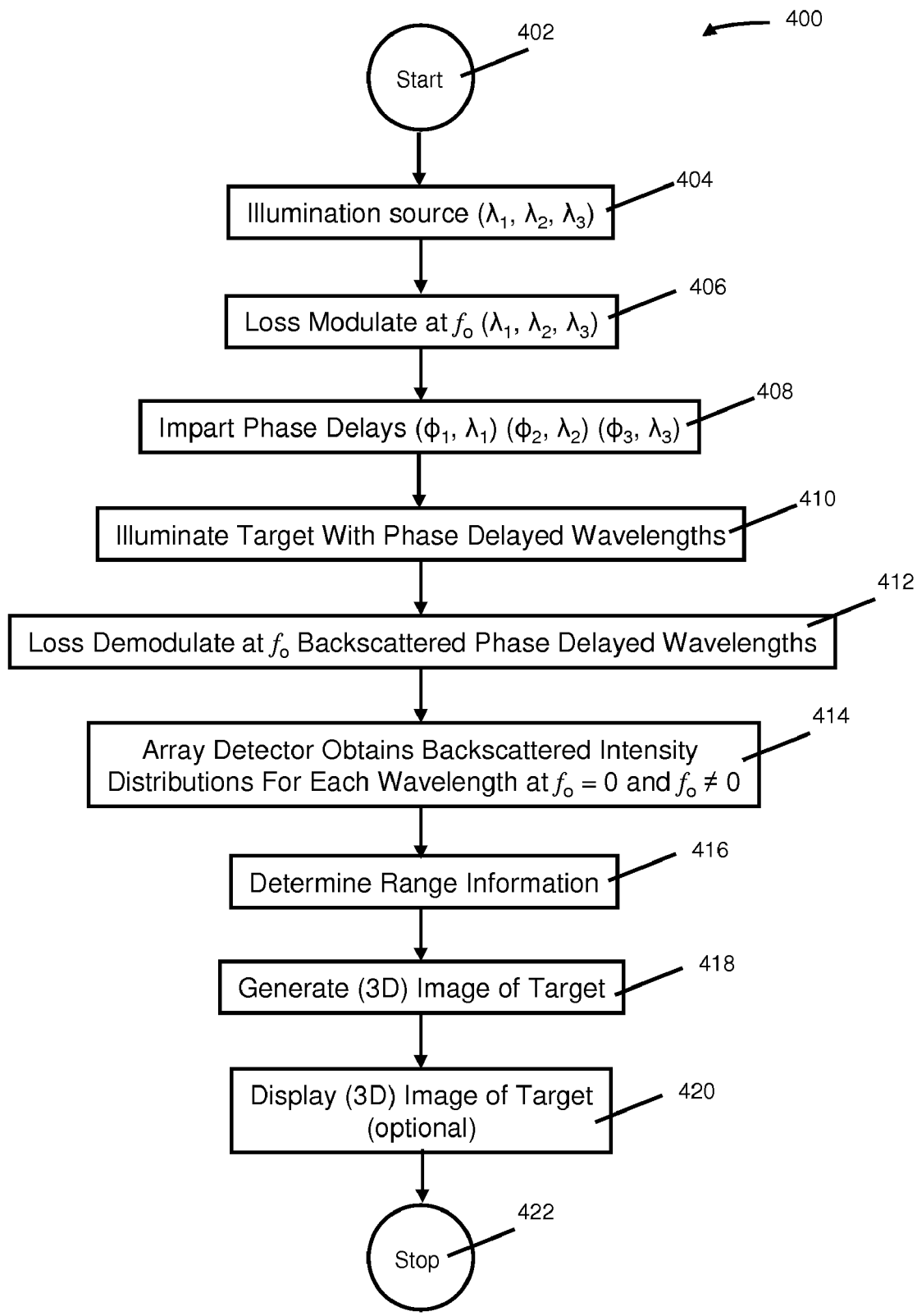
FIG. 4 is a schematic block diagram of an embodiment of a method according to the present invention.

FIG. 4 is a schematic block diagram of an embodiment of a method for providing a three dimensional (3D) image of a target by scannerless loss modulated flash color range imaging, according to the present invention. Examples of physical apparatus suitable for practicing the exemplary embodiment of the inventive methods are described, but not limited to, those in the preceding text.

Method 400 starts at step 402. At step 404 a light source is provided that is capable of producing non-scanned, continuous or flash illumination comprising at least three wavelengths of light (e.g., $\lambda_1, \lambda_2, \lambda_3$). The light source can comprise a broadband light source, for example a xenon lamp, or can as well comprise an array of laser sources of various desired wavelengths. The light source can be operated in a continuously emitting mode to illuminate the target or can be operated in a flash mode, whereby the target is illuminated by a flash of light lasting from on the order of a microsecond to on the order of hundreds of microseconds.

At step 406 the intensity of light from the light source is amplitude loss modulated by a loss modulator. The loss modulator can comprise an electrooptic crystal disposed between a pair of crossed linear polarizers, wherein the electrooptic crystal is modulated at a sinusoidal modulation frequency, $f_o$. For the case where the light source comprises a broadband illumination source, resolution of desired wavelengths can be accomplished by passing the amplitude modulated light exiting the loss modulator, through spectral filter(s).

At step 408 a unique phase delay, e.g. $\phi_1, \phi_2, \phi_3$ is imparted to each of the three (i.e. at least three) wavelengths $\lambda_1, \lambda_2, \lambda_3$ (i.e. each passband containing a wavelength of interest), creating "phase delayed light". For example, each wavelength (i.e. passband) of illumination can be transmitted along a delay line comprising an optical path of know length, to impart the phase delays.

At step 410 the target is illuminated with the phase delayed wavelengths comprising the illumination. As described in the preceding text, three or more wavelengths of light are used to illuminate the target to allow solving the mathematical relationships for determining range information to the target.

At step 412 backscattered phase delayed light from the target is amplitude loss demodulated. The loss demodulator can comprise an electrooptic crystal disposed between a pair of crossed linear polarizers wherein the electrooptic crystal is modulated at the modulation frequency, $f_o$. Depending on the application, the loss demodulator employed at step 412 can comprise the same electrooptic crystal assembly as used in step 406, or can comprise a separate electrooptic crystal assembly as appropriate for the application.

At step 414 an array detector is used to image the intensity distributions for each of the wavelengths of interest. The array detector can comprise a "color" array detector capable of imaging multiple wavelengths or as well could comprise a plurality of monochromatic array detectors. Modulated images are obtained for each wavelength wherein the loss modulator and loss demodulator are operated at a modulation frequency $f_o$, for example, of from approximately one megahertz up to approximately ten gigahertz. Unmodulated (DC) images are additionally obtained for each wavelength wherein the modulator and loss demodulator are not sinusoidally modulated, i.e. the modulation frequency $f_o$, is set substantially equal to zero.

At step 416 range information for the target can be determined on a pixel by pixel basis (i.e. for each pixel within the array detector) based upon comparison of the modulated and unmodulated images, using the mathematical relationships described above. For example, the images (i.e. electrical signal output) from the array detector can be passed to an image processor for performing the mathematical, i.e. image manipulations.

At step 418 having determined the range information to the target, a three dimensional (3D) image of the target can be generated. The image can comprise a color image of the target with range information superimposed for example, as a topographical image.

At optional step 420, generated images of the target can be displayed on a suitable display, for example, for viewing by an operator. The images generated at step 418 need not be displayed, for example in applications where it is simply desired to compare images to a data base, for identification purposes. The method ends at step 422.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. A method to provide a three dimensional (3D) image of a target by scannerless loss modulated flash color range imaging, the method comprising:

providing a continuously emitting light source adapted to provide illumination comprising at least three wavelengths;

modulating by a first loss modulator operated at a modulation frequency, each of the at least three wavelengths;

imparting a phase delay onto each of the at least three wavelengths, thereby creating phase delayed light comprising the at least three wavelengths;

illuminating the target with the phase delayed light;

demodulating by a second loss modulator operated at the modulation frequency, backscattered phase delayed light from the target;

obtaining with an array detector, unmodulated images of intensity distributions for each of the at least three wavelengths comprising the backscattered phase delayed light from the target, wherein the modulation frequency is substantially equal to zero;

obtaining with an array detector, modulated images of the intensity distributions for each of the at least three wavelengths comprising the backscattered phase delayed light from the target, wherein the modulation frequency is not equal to zero;

determining range information to the target based upon comparison of the unmodulated and the modulated images of the intensity distributions of the at least three wavelengths comprising the backscattered phase delayed light from the target; and, generating the three dimensional (3D) image of the target based upon the determined range information.

2. The method of claim 1 further comprising the step of displaying the three dimensional (3D) image of the target on a display.

3. The method of claim 1 wherein the step of illuminating the target comprises illuminating the target for an exposure time ranging from approximately one microsecond up to approximately one hundred microseconds.

4. The method of claim 1 wherein the first loss modulator and the second loss modulator are embodied in one electrooptic crystal assembly.

5. The method of claim 1 wherein the at least three wavelengths comprise wavelengths of light within the visible spectrum.

6. The method of claim 5 wherein the at least three wavelengths comprise wavelengths of approximately 450 nm, approximately 560 nm and approximately 675 nm.

7. The method of claim 6 further comprising the steps of;

generating a color image of the target; and, superimposing range information on the color image of the target.

8. The method of claim 1 wherein the step of modulating by a first loss modulator comprises an intensity loss modulation amplitude range of from approximately thirty percent up to approximately fifty percent.

9. The method of claim 1 wherein the modulation frequency has a value within the range of from approximately one megahertz up to approximately ten gigahertz.

10. The method of claim 1 wherein the step of imparting a phase delay onto each of the at least three wavelengths comprises providing a phase delay line for each of the at least three wavelengths.

11. A method to provide a three dimensional (3D) image of a target by scannerless loss modulated flash color range imaging, the method comprising:

providing a broad band light source and spectral filters, the broad band light source and spectral filters adapted to provide illumination comprising at least three wavelengths;

modulating by a first loss modulator comprising an electrooptic crystal operated at a modulation frequency, each of the at least three wavelengths;

imparting a phase delay onto each of the at least three wavelengths, thereby creating phase delayed light comprising the at least three wavelengths;

illuminating the target with the phase delayed light;

demodulating by a second loss modulator comprising an electrooptic crystal operated at the modulation frequency, backscattered phase delayed light from the target;

obtaining with an array detector, unmodulated images of intensity distributions for each of the at least three wavelengths comprising the backscattered phase delayed light from the target, wherein the modulation frequency is substantially equal to zero;

obtaining with an array detector, modulated images of the intensity distributions for each of the at least three wavelengths comprising the backscattered phase delayed light from the target, wherein the modulation frequency is not equal to zero;

determining range information to the target based upon comparison of the unmodulated and the modulated images of the intensity distributions of the at least three wavelengths comprising the backscattered phase delayed light from the target; and, generating the three dimensional (3D) image of the target based upon the determined range information.

12. The method of claim 11 further comprising the step of displaying the three dimensional (3D) image of the target on a display.

13. The method of claim 11 wherein the step of illuminating the target comprises illuminating the target for an exposure time ranging from approximately one microsecond up to approximately one hundred microseconds.

14. The method of claim 11 wherein the first loss modulator and the second loss modulator are embodied in one electrooptic crystal assembly.

15. The method of claim 11 wherein the at least three wavelengths comprise wavelengths of light within the visible spectrum.

16. The method of claim 15 wherein the at least three wavelengths comprise wavelengths of approximately 450 nm, approximately 560 nm and approximately 675 nm.

17. The method of claim 16 further comprising the steps of;

generating a color image of the target; and, superimposing range information on the color image of the target.

18. The method of claim 11 wherein the step of modulating by a first loss modulator comprises an intensity loss modulation amplitude range of from approximately thirty percent up to approximately fifty percent.

19. The method of claim 11 wherein the modulation frequency has a value within the range of from approximately one megahertz up to approximately ten gigahertz.

20. The method of claim 11 wherein the step of imparting a phase delay onto each of the at least three wavelengths comprises providing a phase delay line for each of the at least three wavelengths.

\* \* \* \* \*